United States Patent
Hogberg et al.

(10) Patent No.: US 6,697,619 B1
(45) Date of Patent: Feb. 24, 2004

(54) DIGITAL BEAMFORMING ACQUISITION SYSTEM

(75) Inventors: Shawn Wesley Hogberg, Chandler, AZ (US); Jonathon Henry Gross, Gilbert, AZ (US); Gerald Joseph Davieau, Eldersburg, MD (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/459,295

(22) Filed: Dec. 10, 1999

(51) Int. Cl.7 .................................................. H04Q 7/20
(52) U.S. Cl. ....................... 455/429; 455/12.1; 455/13.3
(58) Field of Search ................................. 455/427, 428, 455/429, 430, 431, 12.1, 13.1, 13.2, 13.3; 342/352, 354, 356, 359, 360, 368, 371; 370/325

(56) References Cited

U.S. PATENT DOCUMENTS

| | | | |
|---|---|---|---|
| 4,425,639 A | * 1/1984 | Acampora et al. | 370/323 |
| 4,931,802 A | * 6/1990 | Assal et al. | 342/356 |
| 5,355,138 A | 10/1994 | Cances et al. | |
| 5,537,681 A | * 7/1996 | Redden et al. | 455/428 |
| 5,612,701 A | 3/1997 | Diekelman | |
| 5,625,867 A | * 4/1997 | Rouffet et al. | 455/13.1 |
| 5,659,545 A | 8/1997 | Sowles et al. | |
| 5,732,387 A | * 3/1998 | Armbruster et al. | 455/13.2 |
| 5,736,959 A | * 4/1998 | Patterson et al. | 342/354 |
| 5,754,139 A | 5/1998 | Turcotte et al. | |
| 6,016,124 A | 1/2000 | Lo et al. | |
| 6,055,431 A | 4/2000 | Dybdal | |
| 6,101,385 A | * 8/2000 | Monte et al. | 455/427 |
| 6,148,176 A | 11/2000 | Kolev et al. | |
| 6,240,072 B1 | 5/2001 | Lo et al. | |
| 6,545,998 B1 | * 4/2003 | Saunders | 370/347 |
| 6,556,809 B1 | * 4/2003 | Gross et al. | 455/12.1 |

FOREIGN PATENT DOCUMENTS

| | | |
|---|---|---|
| WO | PCT/US 00/28706 | 10/2000 |
| WO | WO 01/41531 A2 * | 6/2001 |

* cited by examiner

Primary Examiner—Charles Appiah
(74) Attorney, Agent, or Firm—Timothy J. Lorenz

(57) ABSTRACT

A satellite communications system (10) provides for digital beamforming acquisition. The communications system (10) has an antenna configuration (20) for maintaining communications links with satellite networking equipment, and a signal processing system (30) for processing signals resulting from the communications links. A beamforming subsystem (40) dynamically forms traffic beams and overhead beams, wherein the overhead beams scan overhead areas of the satellite footprint. Overhead areas are defined by areas of the satellite footprint without active traffic channels. The beamforming subsystem (40) includes a channel database configuration (50) containing traffic channel input data and overhead channel input data. A beamforming processor (60) converts the input data contained in the channel database configuration (50) into traffic beams schedules and overhead beam schedules. An antenna management system (70) dynamically forms traffic beams and overhead beams based on the beam schedules.

26 Claims, 6 Drawing Sheets

DIGITAL BEAMFORMING ACQUISITION SYSTEM

BACKGROUND OF THE INVENTION

1. Technical Field

The present invention relates generally to satellite communication systems. More particularly, the present invention is directed to a system and technique for providing communication channel coverage on a periodic basis.

2. Discussion

A primary interest of telecommunications technology is enhancing the features offered by communication systems and expanding the coverage area of these systems. The principal goal behind developing next generation communication systems is either to improve the transmission fidelity, to increase the data rate, or to increase the distance between relay stations. In an effort to accomplish these objectives, earth-based (or terrestrial) communication systems have evolved over the years to incorporate high-speed electro-optic equipment and optical fibers. The result has been a substantial increase in the fidelity and speed of transmissions. Optical communication has therefore allowed quality and grade of service to reach new heights. Optical communication systems have not provided, however, a solution to the increasing mobility of today's society and the need for global communication.

First generation satellite telecommunication systems are now capable of providing communications services around the world using RF signals. These sophisticated communications satellites transmit many telephone, data and television signals simultaneously over long distances. From the beginning, satellite communications networks have employed a plurality of interconnected space vehicles, or satellites, in an effort to provide satellite communication channels to subscriber equipment almost anywhere on Earth. Conventional satellites used fixed antenna beams to provide communication channel coverage over the entire satellite footprint. This technique of providing communications links is potentially inefficient due to the need to provide coverage over the entire satellite footprint while providing high gain antenna beams to improve link quality and subscriber equipment characteristics. For example, the additional necessary hardware required to form enough fixed high gain antenna beams to cover the satellite footprint will substantially increase the satellite size, weight, power, and processing requirements. The communications electronics payload is also affected because of the added complexity of the switching, routing, and processing of the communication channels associated with these beams.

Recent trends have been toward providing an increasing number of narrow antenna beams to improve spectral efficiency, link quality, and improve subscriber equipment characteristics (e.g. size, weight, power, channel throughput, etc.). Thus, satellites are configured with an array of antenna beams that can provide hundreds of signals to predetermined areas of the satellite footprint. This technique provides a means to deal with increased antenna complexity while providing complete coverage within the satellite footprint.

Satellite communication systems now offer subscribers the opportunity to use handheld phones and pagers all through one seamless global network. The use of narrow satellite antenna beams provides subscriber equipment with the ability to transmit and receive data over communication channels at a very high speed and with remarkable clarity. A problem arises, however, with respect to inactive subscriber equipment located outside the reach of the limited number of narrow high gain beams. The problem is in providing active traffic communication channels that can be reasonably implemented as part of the satellite architecture. For example, when an inactive subscriber desires access to the network, the traditional satellite system provides acquisition channels across the entire satellite footprint for at least some portion of the communication frame by using antenna arrays with enough capability to provide enough narrow beams to fill the satellite footprint. As the antenna beams become narrower, the antenna array complexity becomes overwhelming.

It is therefore desirable to provide a mechanism for maintaining complete coverage within the satellite footprint while limiting the number of simultaneous narrow beams formed by the antenna array. Furthermore, it is desirable to ensure that the acquisition and other overhead channel latencies are controlled and optimized for quality of service. Specifically, conventional approaches fail to provide a means for the communications system to provide an efficient low latency call acquisition and call setup process. It is therefore desirable to provide a system and technique for periodically transmitting and receiving data using overhead communication channels across the entire satellite footprint by using a limited number of antenna beams while maintaining the system quality of service performance. Channel coverage should include broadcast, acquisition, and link control channels.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE PREFERRED EMBODIMENT

Figure 1:
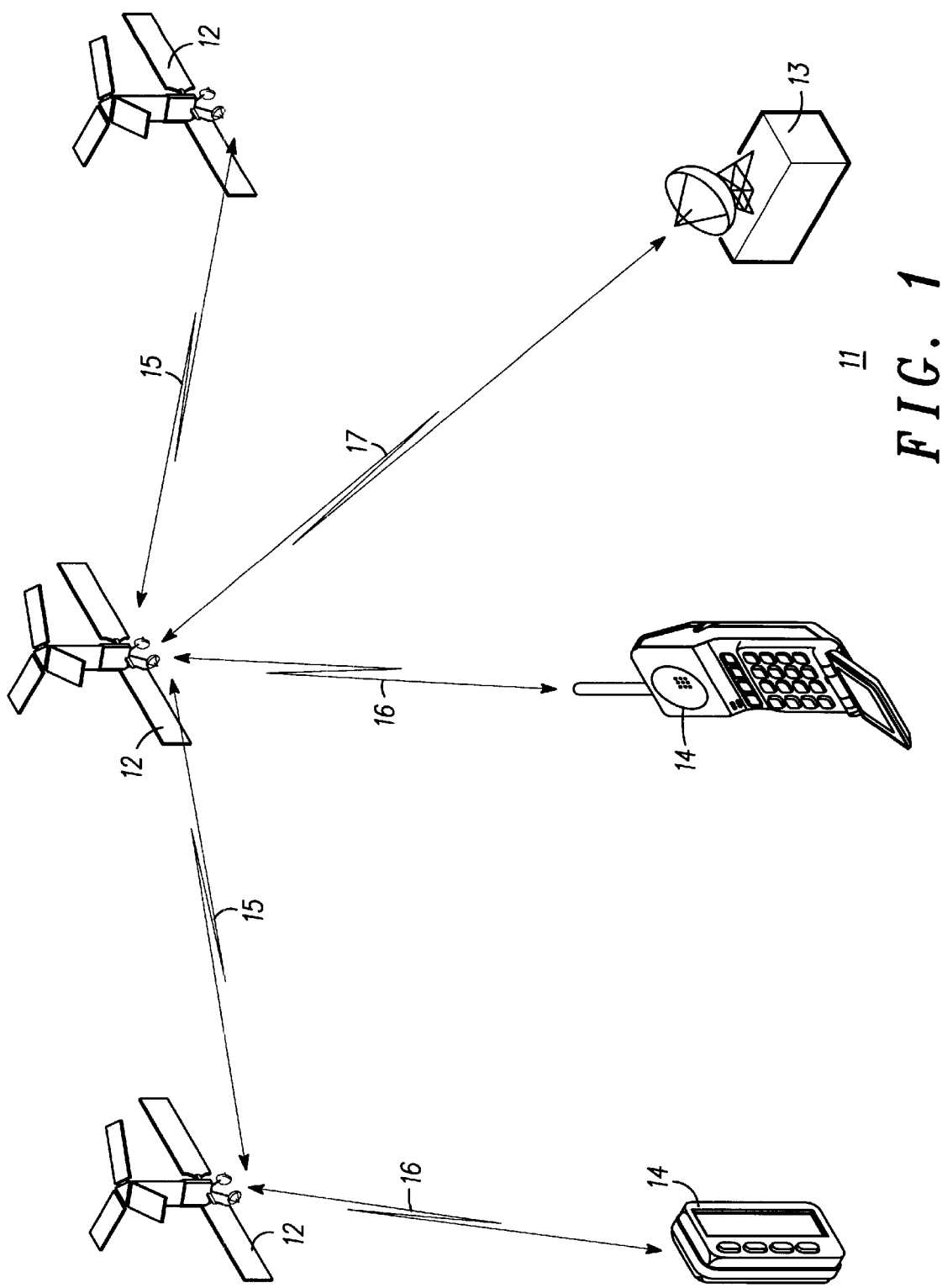
FIG. 1 is a diagram showing the components of the satellite communications network of the present invention.

Turning now to FIG. 1, a satellite communications network 11 is shown in accordance with a preferred embodiment of the present invention. Although FIG. 1 illustrates a highly simplified diagram of communications network 11, network 11 includes a number of satellites 12, any number of subscriber devices 14, and any number of ground stations 13. Although the present invention is applicable to space-based communications networks 11 having at least one satellite 12 in low-earth or medium-earth orbit, each satellite 12 is preferably part of a number of satellites in low-earth orbit around earth. In alternative embodiments, however, satellite 12 can be a medium-earth orbit satellite or geosynchronous satellite. The constellation of satellites can be in the same satellite network, or can be in different satellite networks.

A "satellite" as used herein means a man-made object or vehicle, which orbits the earth at non-geostationary altitudes or geostationary altitudes. Non-geostationary altitudes are considered to be low-earth or medium-earth altitudes. A "constellation" means a number of satellites arranged in orbits for providing specified coverage of a portion, portions or all of the earth. Coverage includes but is not limited to radio communication and remote sensing. A constellation typically includes multiple rings or planes of satellites and can have an equal number of satellites in each plane, although this is not essential.

Thus, satellite 12 can be one of many satellites in at least one constellation of satellites orbiting the earth. The present invention is also applicable to space-based communication networks 11 having satellites 12, which orbit the earth at any angle of inclination including polar, equatorial, inclined or other orbital patterns. The present invention is therefore applicable to networks 11 wherein full coverage of the earth is not achieved (i.e., where there are "holes" in the communication coverage provided by the constellation) and to networks 11 wherein plural coverage of portions of the earth occurs (i.e., more than one satellite is in view of a particular point on the earth's surface).

Each satellite 12 communicates with other adjacent satellites 12 through crosslinks 15 in a preferred embodiment of the present invention. These crosslinks 15 form the backbone of space-based satellite communications network 11. Thus, a call or communication from one subscriber device 14 located at any point on or near the surface of the earth can be routed through a satellite or constellation of satellites to virtually any other point on the surface of the earth. A communication link can be routed down to a subscriber device 14 (which is receiving the call) on or near the surface of the earth from another satellite. In alternative embodiments, if there are no crosslinks 15, one satellite 12 can communicate with another satellite 12 via routing the call through ground station 13.

Subscriber devices 14 can be located anywhere on the surface of the earth or in the atmosphere above the earth. Communications network 11 can accommodate any number of subscriber devices 14. Subscriber devices 14 preferably include communication devices capable of transmitting and receiving data. The data can be of any type, including alpha numeric or numeric data. For example, a subscriber device 14 can be a satellite telephone or satellite pager. Moreover, a subscriber device 14 does not have to be mobile or moving, but can be fixed in one location for an extended period of time.

Ground station 13 communicates with and controls satellites 12. For example, in one type of system the ground station 13 can be a gateway or satellite control facility. In a preferred embodiment, there can be multiple ground stations 13 located at different regions on the earth. For example, there can be one ground station 13 located in Honolulu, another located in Los Angeles and another in Washington, D.C. Another example is to have separate ground stations 13 located in each country on the earth. Ground stations 13 can provide satellite control commands to satellites 12 such that satellites 12 maintain their proper orbital position and perform other essential housekeeping tasks. Ground stations 13 can be additionally responsible for receiving calling packet data, packaging data or other types of information from satellite 12.

Figure 2:
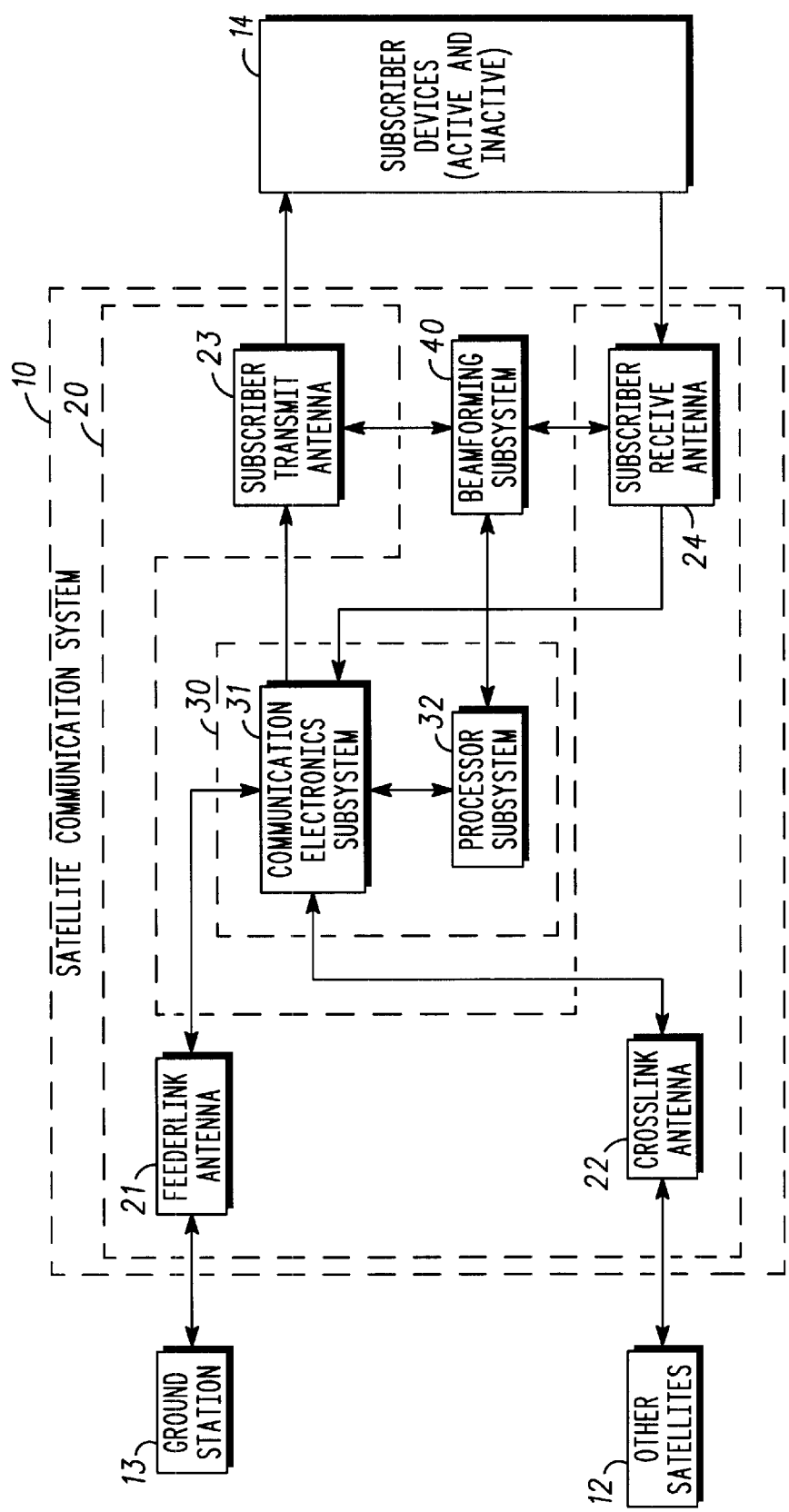
FIG. 2 is a diagram of the satellite communications system of the present invention.

It will be appreciated that ground stations 13 provide certain basic services within satellite communications network 11. For example, they provide control of access to the network 11 for subscribers for whom the ground station 13 is "home". Therefore, information will be stored at the ground station 13 about certain subscribers, including information to authenticate the subscriber's identity and what services are available to the subscriber. The ground stations 13 also provide network subscribers with assess to public switched telephone network (PSTN) and it provides PSTN customers with access to subscribers throughout the communications network 11. As shown in FIG. 2, satellites 12 have a satellite communications system 10 to be described below, which provides communication channels to subscriber devices 14. In accordance with the present invention, traffic channels are provided to active subscriber devices, and overhead channels are used to provide broadcast and acquisition opportunities for active and inactive subscriber devices.

Figure 6:
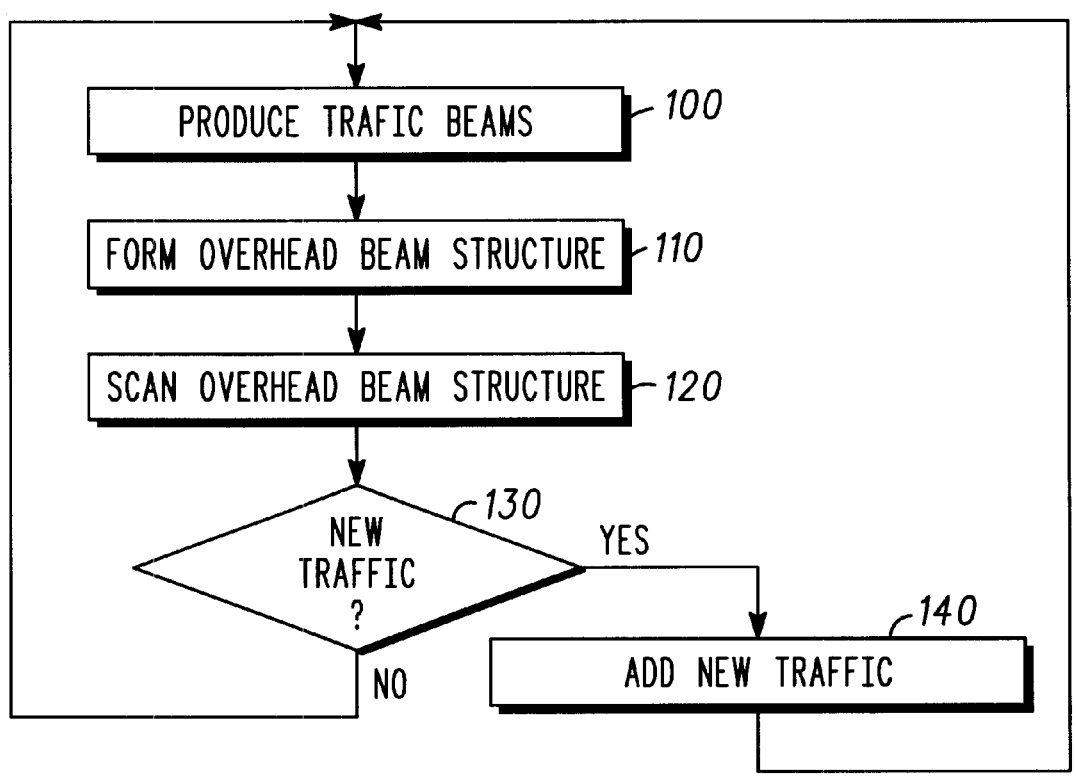
FIG. 6 is a flowchart of a method for providing satellite communication channels within a satellite footprint according to the present invention.

Thus, as shown in FIG. 6, traffic beams are produced in traffic areas of the satellite footprint at step 100. At step 110, an overhead beam structure is formed, and at step 120 the overhead beam structure is scanned in overhead areas of the satellite footprint. The overhead areas of the satellite footprint are defined as areas without active traffic channels. In the preferred embodiment, the traffic beams also contain overhead channels. If it is determined at step 130 that joining subscriber devices are present in the scanned area, this means that new traffic is present in the overhead areas of the satellite footprint. The new traffic will therefore be added to the communication channels at step 140. At this point, a new traffic channel beam may be formed or an existing traffic channel beam location or shape may be modified to provide coverage in a traffic channel beam for this joining subscriber. In addition, the overhead scanning beams and scan patterns will be modified to account for this new or modified traffic channel beam.

Figure 7:
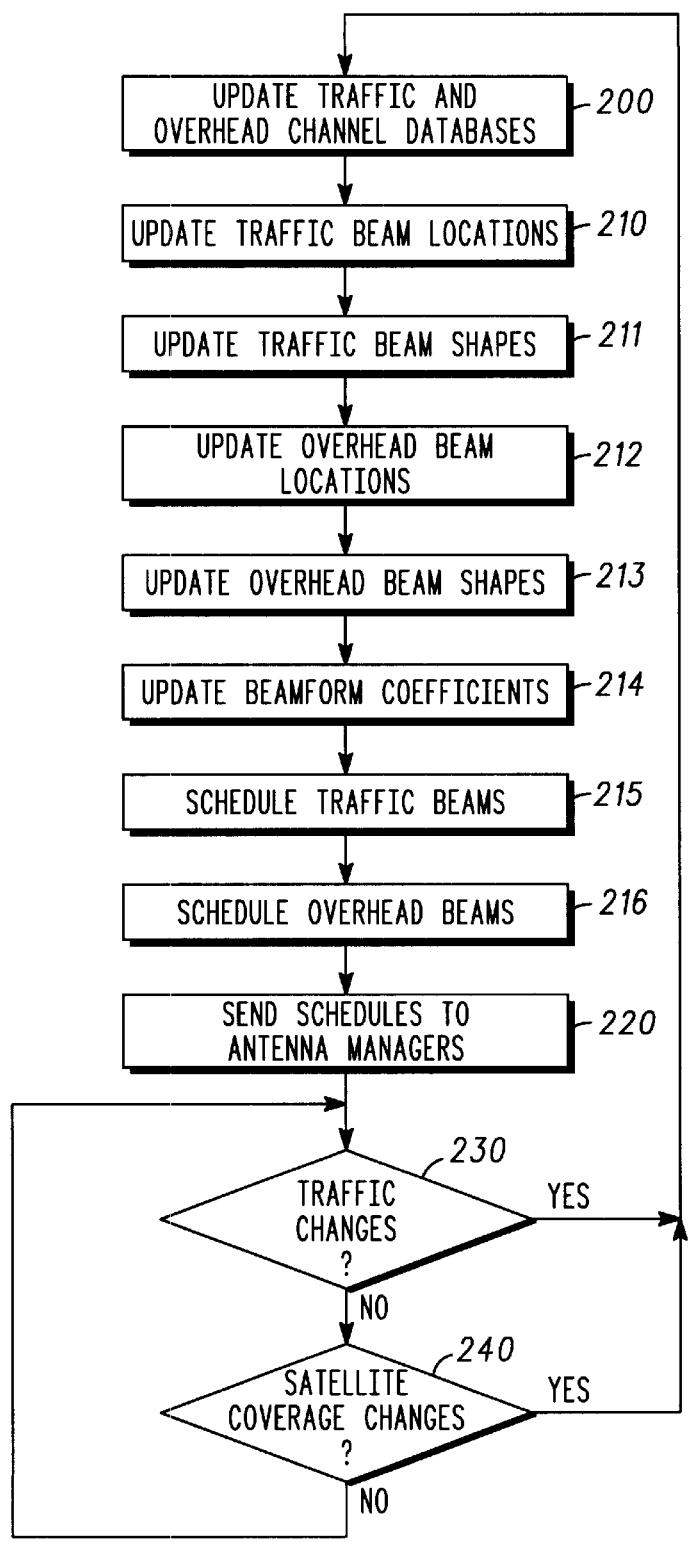
FIG. 7 is a more detailed flowchart of the process shown in FIG. 6.

Turning now to FIG. 7, the preferred beamforming flow diagram is shown in greater detail. Specifically, at step 200 the traffic and overhead channel databases (to be described later) are updated. The traffic beam locations are updated at step 210, and the traffic beam shapes are updated at step 211. The information necessary to update locations and shapes is contained in the aforementioned databases. It will be appreciated that at step 212 the overhead beam locations are updated, and at step 213 the overhead beam shapes are updated in a manner similarly to that of the traffic beams. It can further be appreciated that beamforming coefficients are updated at step 214. The necessary scheduling for the traffic beams and the overhead beams is then performed at steps 215 and 216, respectively. At step 220, the schedules are sent to the antenna managers to be discussed below. Step 230 provides for the determination of whether traffic changes have occurred. Similarly, at step 240 it can be determined whether satellite coverage has changed. When such changes occur, the present invention provides for modification of the beam structure accordingly.

Figure 3:
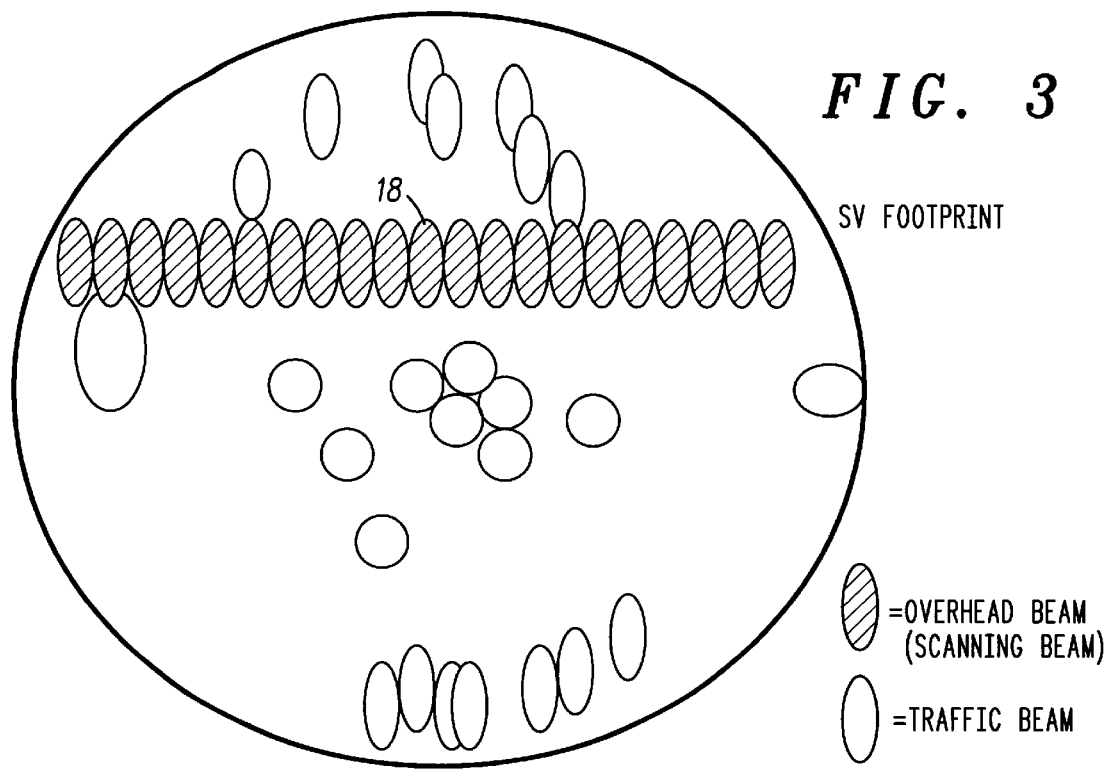
FIG. 3 is a diagram of the traffic and overhead beam structure at an instant in time according to the present invention.

As already discussed, it is preferred that the traffic beams contain both traffic channels and overhead channels. By using the traffic beams for overhead channels, the number of beams formed for providing overhead channels in areas without active subscribers is minimized. Overhead channels for both the traffic and overhead beams include broadcast as well as acquisition channels. Turning now to FIG. 3, it can be seen that the overhead beam structure is made up of an array of overhead beams 18. Preferably, the satellite communications system is designed to produce an overhead beam in every region of the overhead areas at least once per second.

Returning now to FIG. 2, the preferred satellite communications system 10 of the present invention is shown. It can be appreciated that communications system 10 is designed and programmed to perform the above steps and functions as well as others to be discussed below. Specifically, communications system 10 has an antenna configuration 20, a signal processing system 30, and a beamforming subsystem 40. The antenna configuration 20 maintains communications links with satellite networking equipment, while the signal processing system 30 processes the signals resulting from the communications links. The beamforming subsystem 40 dynamically forms traffic beams and overhead beams based on the processed signals, wherein the overhead beams scan overhead areas of the satellite footprint. Overhead areas are defined by areas of the satellite footprint without active traffic channels.

Specifically, it can be seen that the antenna configuration 20 preferably includes a feederlink antenna 21 for maintaining feederlinks 17 with ground stations 13. A crosslink antenna 22 is also included and maintains crosslinks 15 with satellites 12. Generally, a subscriber antenna configuration maintains subscriber links 16 with subscriber devices 14. Specifically, the subscriber antenna configuration includes a subscriber transmit antenna 23 for transmitting subscriber link beams to subscriber devices 14, and a subscriber receive antenna 24 for receiving subscriber link signals from subscriber devices 14.

Preferably, the signal processing system 30 has a communication electronics subsystem 31 for performing communication functions in the communications system 10. Specifically, the communication electronics subsystem 31 performs frequency conversion, switching, and modem functions. A processor subsystem 32 performs management and control functions in the communications system 10. As will be discussed later, the processor subsystem 32 updates a channel database configuration with channel-input data and overhead channel input data for use in beamforming. The processor subsystem 32 preferably performs channel management, satellite resource management, and satellite control functions.

Figure 4:
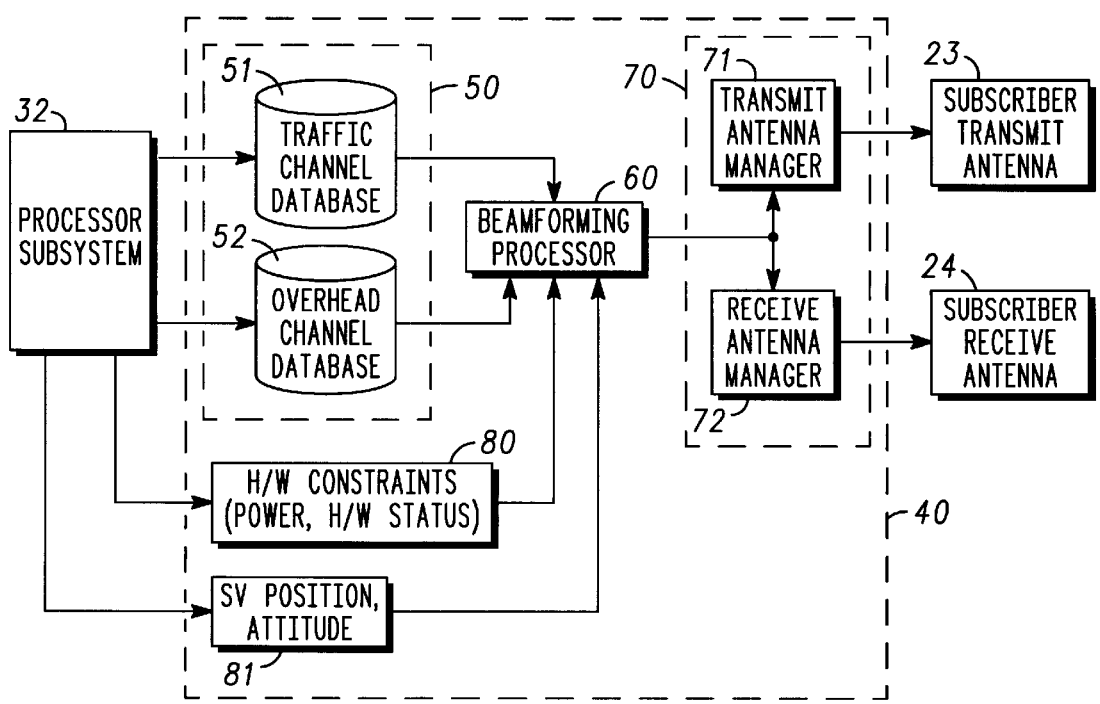
FIG. 4 is a block diagram of the beamforming subsystem of the present invention.

Turning now to FIG. 4, the beamforming subsystem 40 will be described in greater detail. It will be appreciated that the beamforming subsystem 40 includes a channel database configuration 50, a beamforming processor 60, and an antenna management system 70. The channel database configuration 50 contains traffic channel input data and overhead channel input data. The beamforming processor 60 converts the input data contained in the channel database configuration 50 into traffic beam coefficient schedules and overhead beam coefficient schedules. The antenna management system 70 dynamically forms traffic beams and overhead beams based on the beam schedules. The overhead beams scan overhead areas of the satellite footprint, wherein the overhead areas are defined by areas of the satellite footprint without active traffic channels. Specifically, the channel database configuration 50 includes a traffic channel database 51 containing current traffic channel requirements, and an overhead channel database 52 containing current overhead channel requirements. It is important to note that beamforming subsystem 40 can be implemented entirely on the ground or partially on the ground via ground stations 13 (FIG. 1).

Figure 5:
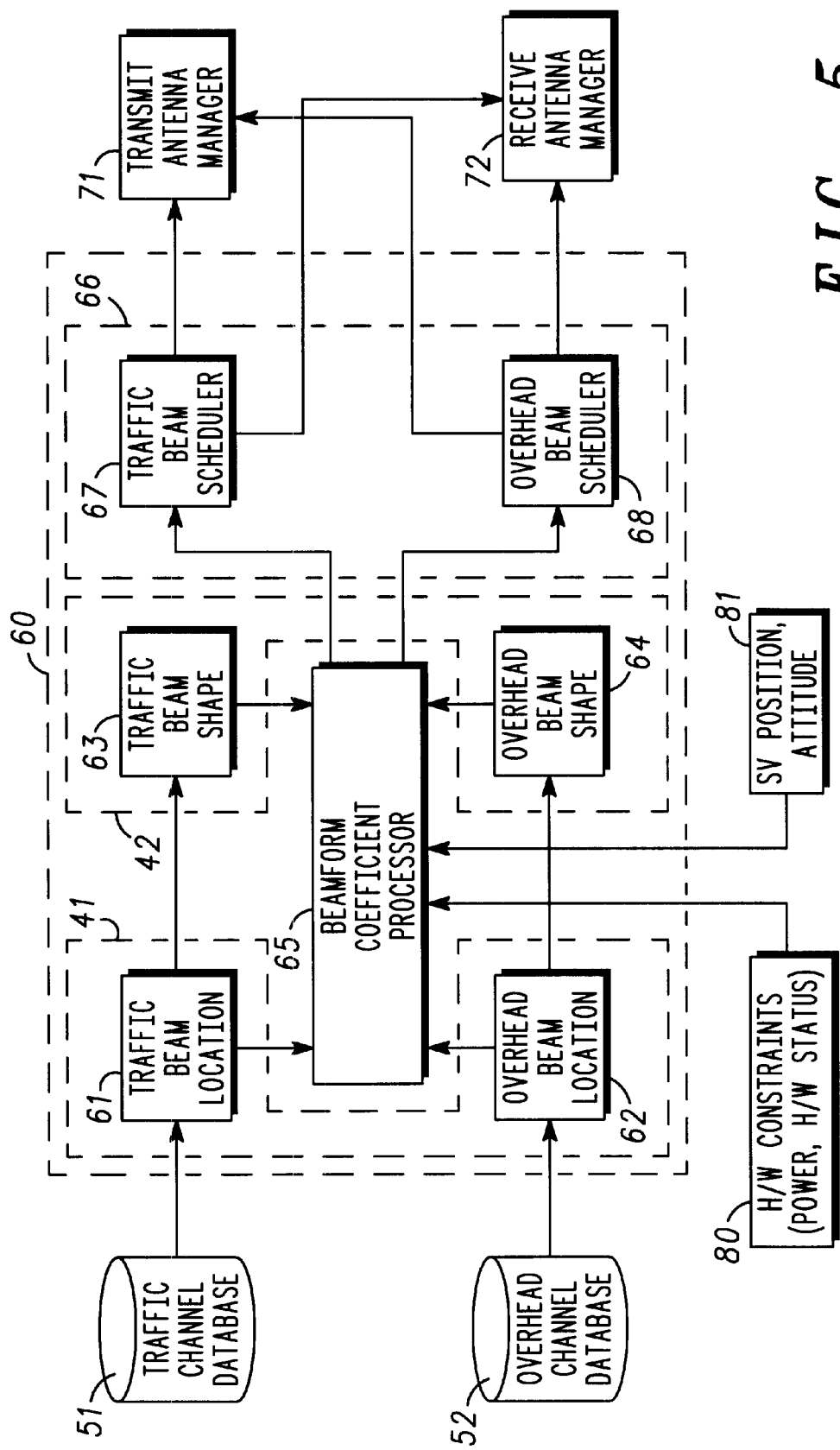
FIG. 5 is a block diagram of a beamforming processor according to the present invention.

With reference to FIG. 5, the beamforming processor 60 will be described in greater detail. It will be appreciated that the beamforming processor 60 has a beam location system 41 for updating beam locations based on the input data contained in the channel database configuration. Specifically, the beam location system 41 includes a traffic beam location module 61 for updating traffic beam locations, and an overhead beam location module 62 for updating overhead beam locations. The beam forming processor 60 further includes a beam shape system 42 for updating beam shapes based on the input data contained in the channel database configuration and the updated beam locations. Specifically, the beam shape system 42 has a traffic beam shape module 63 for updating traffic beam shapes, and an overhead beam shape module 64 for updating overhead beam shapes. It will be appreciated that beam locations and shapes relate to pointing angles and contours of generated beams.

It can be seen that the beamforming processor 60 further includes a beam coefficient processor 65 for calculating antenna coefficients (e.g. phase and amplitude coefficients of each element in the antenna array) based on the updated beam locations, the updated beam shapes, and physical configuration data relating to the antennas. Preferably, the beamform coefficient processor 65 calculates transmit antenna coefficients and receive antenna coefficients. The beamforming processor 60 further includes a beam scheduling system 66 for generating beam coefficient schedules based on the calculated antenna coefficients and the input data contained in the channel database configuration. The beam scheduling system 66 has a traffic beam scheduler 67 for generating traffic beam coefficient schedules, and an overhead beam scheduler 68 for generating overhead beam coefficient schedules. Preferably, the schedules take into account time slot requirements in a Time Division Multiple Access (TDMA) system, such that the beams are formed based on the coefficients in the correct time slot corresponding to the channel assignments originally calculated by the processor subsystem 32 (FIG. 4).

Returning to FIG. 4, it will be appreciated that the antenna management system 70 includes a transmit antenna manager 71, and a receive antenna manager 72. The transmit antenna manager 71 dynamically forms beams for the subscriber transmit antenna 23, whereas the receive antenna manager 72 dynamically forms beams for the subscriber receive antenna 24. The control functions performed by the antenna managers 71 and 72 include managing antenna hardware such as antenna array element weightings, phase shifters, etc. It will further be appreciated that the beamforming subsystem 40 further includes a hardware constraint module 80 for providing the beamforming processor 60 with satellite hardware constraint data. The hardware constraint data allows the satellite to avoid power consumption problems and ensures that there is enough hardware (e.g. switching, tuners, antenna elements) to support the number of beams formed in any single time slot. A satellite position and attitude module 81 is also included for providing the beamforming processor 60 with satellite position and attitude data. The satellite position and attitude are necessary to correctly point the antenna beams over the subscriber locations.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method for providing satellite communication channels within a satellite footprint, the method comprising the steps of:

producing a set of traffic beams in traffic areas of the satellite footprint;

forming an overhead beam structure; and scanning the overhead beam structure in overhead areas of the satellite footprint, the overhead areas defined by areas of the satellite footprint outside the traffic areas.

2. The method of claim 1 wherein the traffic beams contain traffic channels.

3. The method of claim 2 wherein the traffic beams contain overhead channels.

4. The method of claim 3 wherein the overhead channels include broadcast channels.

5. The method of claim 3 wherein the overhead channels include acquisition channels.

6. The method of claim 1 wherein the overhead beam structure includes an array of overhead beams.

7. The method of claim 6 wherein the overhead beams contain overhead channels.

8. The method of claim 7 wherein the overhead channels include broadcast channels.

9. The method of claim 7 wherein the overhead channels include acquisition channels.

10. The method of claim 6 further including the step of producing an overhead beam in every region of the overhead areas at a predetermined rate.

11. A satellite communications system comprising:
    an antenna configuration for maintaining communications links with satellite networking equipment;
    a signal processing system for processing signals resulting from the communications links; and
    a beamforming subsystem for dynamically forming traffic beams and overhead beams based on the signals processed by the signal processing system, the overhead beams scanning overhead areas of a satellite footprint, the overhead areas defined by areas of the satellite footprint without active traffic channels.

12. The communications system of claim 11 wherein the antenna configuration includes:
    a feederlink antenna for maintaining feederlinks with ground stations;
    a crosslink antenna for maintaining crosslinks with satellite vehicles; and
    a subscriber antenna configuration for maintaining subscriber links with subscriber devices.

13. The communications system of claim 12 wherein the subscriber antenna configuration includes:
    a subscriber transmit antenna for transmitting subscriber link beams to subscriber devices; and
    a subscriber receive antenna for receiving subscriber link signals from subscriber devices.

14. The communications system of claim 11 wherein the signal processing system includes:
    a communication electronics subsystem for performing communication functions in the communications system; and
    a processor subsystem for performing management and control functions in the communications system, the processor subsystem updating a channel database configuration with traffic channel input data and overhead channel input data.

15. The communications system of claim 14 wherein the communication electronics subsystem performs frequency conversion, switching, and modem functions.

16. The communications system of claim 14 wherein the processor subsystem performs channel management, satellite resource management and satellite control functions.

17. The communications system of claim 11 wherein the beamforming subsystem includes:
    a channel database configuration containing traffic channel input data and overhead channel input data;
    a beamforming processor for converting the input data contained in the channel database configuration into traffic beam coefficient schedules and overhead beam coefficient schedules; and
    an antenna management system for dynamically forming traffic beams and overhead beams based on the beam coefficient schedules.

18. A beamforming subsystem for a satellite communications system, the beamforming subsystem comprising:
    a channel database configuration containing traffic channel input data and overhead channel input data;
    a beamforming processor for converting the input data contained in the channel database configuration into traffic beam coefficient schedules and overhead beam coefficient schedules; and
    an antenna management system for dynamically forming traffic beams and overhead beams based on the beam coefficient schedules, the overhead beams scanning overhead areas of a satellite footprint, the overhead areas defined by areas of the satellite footprint without active traffic channels.

19. The beamforming subsystem of claim 18 wherein the channel database configuration includes a traffic channel database containing current traffic channel requirements, and an overhead channel database containing current overhead channel requirements.

20. The beamforming subsystem of claim 18 wherein the beamforming processor includes:
    a beam location system for updating beam locations based on the input data contained in the channel database configuration;
    a beam shape system for updating beam shapes based on the input data contained in the channel database configuration and the updated beam locations;
    a beamform coefficient processor for calculating antenna coefficients based on the updated beam locations, the updated beam shapes, and physical configuration data; and
    a beam scheduling system for generating beam coefficient schedules based on the calculated antenna coefficients and the input data contained in the channel database configuration.

21. The beamforming subsystem of claim 20 the beam location system includes:
    a traffic beam location module for updating traffic beam locations; and
    an overhead beam location module for updating overhead beam locations.

22. The beamforming subsystem of claim 20 wherein the beam shape system includes:
    a traffic beam shape module for updating traffic beam shapes; and
    an overhead beam shape module for updating overhead beam shapes.

23. The beamforming subsystem of claim 20 wherein the beamform coefficient processor calculates transmit antenna coefficients and receive antenna coefficients.

24. The beamforming subsystem of claim 20 wherein the beam scheduling system includes:
    a traffic beam scheduler for generating traffic beam coefficient schedules; and
    an overhead beam scheduler for generating overhead beam coefficient schedules.

25. The beamforming subsystem of claim 18 wherein the antenna management system includes:
    a transmit antenna manager for dynamically forming beams for a subscriber transmit antenna; and
    a receive antenna manager for dynamically forming beams for a subscriber receive antenna.

26. The beamforming subsystem of claim 18 further including:
    a hardware constraint module for providing the beamforming processor with satellite hardware constraint data; and
    a satellite position and attitude module for providing the beamforming processor with satellite position and attitude data.

* * * * *